Feb. 4, 1969  G. B. MARGOLA  3,425,396
EQUIPMENT FOR VARNISHING CERAMIC STOCK SEMI-FINISHED
PRODUCTS, IN PARTICULAR CROCKERY
Filed Feb. 9, 1966
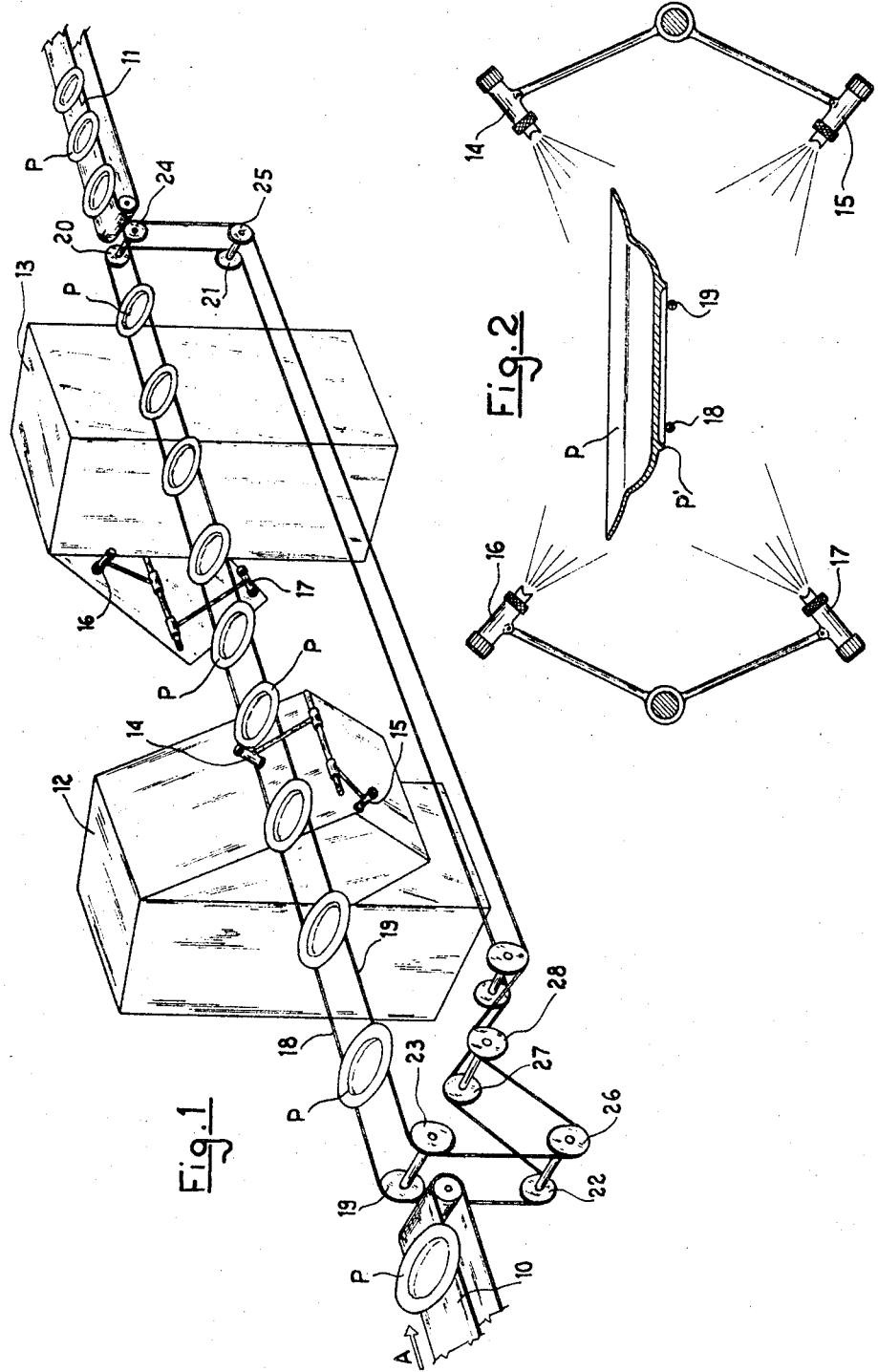

United States Patent Office 3,425,396
Patented Feb. 4, 1969

3,425,396
EQUIPMENT FOR VARNISHING CERAMIC STOCK SEMI-FINISHED PRODUCTS, IN PARTICULAR CROCKERY
Gianni B. Margola, Milan, Italy, assignor to Societá Ceramica Italiana Richard Ginori S.p.A., Milan, Italy
Filed Feb. 9, 1966, Ser. No. 526,098
Claims priority, application Italy, Sept. 15, 1965, 9,042/65
U.S. Cl. 118—316     5 Claims
Int. Cl. B05b *13/02;* B05c *11/16*

ABSTRACT OF THE DISCLOSURE

Apparatus for coating ceramic articles including an endless wire conveyor which contacts only small portions of the articles while they are sprayed on top and bottom by plural spray nozzles located in a spray booth.

---

This invention relates to an equipment the object of which is the mechanical executing of the so-called "varnishing" operations on semi-finished products made from raw-state ceramic stock, in the manufacturing of crockery and in particular of table plates (dinner plates and soup plates) made from ceramic stock of the known composition, preferably the so-called "vitreous-china" type.

Essentially, in accordance with the invention, the equipment is mainly reserved to become one of the operating units of complex installations for the industrial manufacturing, through mechanized cycle, of said products and articles in ceramic stock.

So far as known the operation covering the varnishing of said semi-finished products results in the application, on the surface of plates previously dried and finished, of a very even layer of a suitable glazing varnish. Due to obvious reasons, said varnish shall entirely cover the surface of the article, and at any rate, the positions supporting the article, as required to support it during the varnishing, generally by spray, are to be restricted to the minimum and such to prevent the formation of noticeable defects on the finished product. The varnishing operation, so far as known carried out in suitable booths, implies some operations of a certain complexity, and does not lend itself to an entire mechanizing of the related stage of the manufacturing cycle.

According to the invention, the solution of technical problems, concerning the mechanizing of said stage, is substantially characterized by the use, with the object to attain the feeding and successive flowing of the single semi-finished items to be varnished, under the action of spray varnishing devices, of a support and transport system operating as a conveyor carpet or belt but materialized by a pair of comparatively fine wires, appropriately spaced, circulating in parallel and at a suitable linear rate around suitable transmission pulleys system, in order to present supporting points of minimum sections, but sufficient to firmly support the plates flowing through at least one varnishing booth, with a simple translation rectilinear movement, without other collateral movements.

In particular, the wires conveyor unit comprises one active feeding portion, rectilinear and essentially horizontal, which goes through two varnishing booths where at least one nozzle, and preferably a plurality of nozzles, is arranged and directioned in order to spray the glazing varnish towards different directions on both the upper and lower surfaces of the plate, thus ensuring an even varnishing, compensating the eventual unevennesses of the varnish deposited, resulting from the shape of the plate, compared the direction of varnish spray by each single nozzle.

The essential characteristics, and the technical and industrial effects as a result of the invention, will be apparent in the course of the following detailed description covering a preferred example of execution of this equipment, and shown in the accompanying diagram, only schematically and restricted to its components and characteristic means, since the structural embodiments of said means can be achieved, in different manners, by the application of the actual know-how in the field of spray varnishing.

FIG. 1 shows in perspective the entire varnishing installation, according to the invention.

FIG. 2 shows schematically a typical example of the related placing and positioning among the semi-finished product to be varnished, the means for driving it and the elements which carry-out the spray of glazing varnish.

As exemplified in FIG. 1, the equipment object of the invention is reserved for the successive varnishing of a plurality of pieces P; typically ceramic stock plates, pieces which are fed in continuous through the installation, in particular flowing from an equipment for the mechanical finishing, and to be further driven, after the cleaning, to the stove, preferably in the course of a processing cycle comprising a single stage for the contemporary baking of the ceramic stock piece and of the related varnish.

Said pieces P can preferably be fed to the equipment in succession, through a known conveyor carpet or belt 10, running towards the position A, and then collected, on to a second conveyor carpet or belt 11, in order to be further driven to the other processing operating units, after completion of the varnishing.

The actual varnishing installation comprises preferably two booths 12 and 13, through which pieces P are successively passed, and where the pieces are subjected to the action of pairs or a plurality of spray nozzles 14 and 15 namely 16 and 17, arranged thus to direct the related spray of glazing varnish against the upper and namely lower surface of pieces P, from different directions.

The spray varnishing operation is carried out by known means and methods, comprising the atomizing of the varnish, with or without air. Since the equipment object of this invention is generally reserved to become a component of a complex mechanizing installation, the traverse rate of pieces submitted to the action of the spraying and atomizing devices 14–17, depends on the rate by which said pieces are flowing to other parts of the installation. Thus, the thickness of the varnish to be distributed on the single pieces is properly regulated by changing the composition of the varnish, the delivery and however the characteristics of its atomizing, and, if required, the amount of the atomizing devices arranged and operating in the booth or different booths in series within said equipment.

According to a major embodiment of the invention said pieces are driven, through said booths and under the action of said devices, by means of a rectilinear conveyor system which material means for supporting and feeding the pieces consist of two wires 18 and 19, preferably metal wires, of minimum section suitable however to the required mechanical strength, said wires being ring-closed and running around a set of pairs of transmission pulleys 19–22 namely 23–26, the circulating system of said wires can obviously comprise further pulleys, for example tension pulleys 27 and namely 28, a part of said pulleys being connected to a driving system, not shown and which ensures the circulating cycle of said wires.

As in particular shown in FIG. 2, the two wires 18 and 19 are spaced thus forming a support base sufficient wide for firmly supporting the pieces, but included in the room as determined by the profile of the lower edge P' of the pieces. The wires are kept under a sufficient pressure in order that their upper rectilinear portions, included among pulleys 19, 23 and 20, 24, will result essentially horizontal, coplanar and parallel.

Due to the very tiny section of said wires 18 and 19 (section which in FIG. 2 is shown very enlarged due to graphical requirements) the deposition of the varnish on pieces P, entirely undisturbed concerning the upper surface of said pieces, is disturbed only in a negligible amount also regarding the lower surface of the pieces. Practically, each single piece will contact the underlaying support and feeding wires, only on four points, that is at the points where the straight-lines materialized by said wires intersect the so-called "extension" P' of said pieces. The different orientation of spray nozzles 15 and 17 operating against the lower surface of the pieces, permits to eliminate the masking and "shade" that said wires could impart to the rear restricted surface areas.

The evidence has been attained that the varnishing defect which could occur due to the presence of said contact point is negligible, and it is fully prevented by the surface tensio-active phenomena of the fluid varnish, which spontaneously will flow to cover said very tiny contact areas.

The feeding movement of the pieces P through the equipment occurs very regularly and under the form of a simple rectilinear translation, thus preventing any collateral or different movement, for example tilting, rotation or other movements, which actually are considered as a requirement in order to ensure a varnishing with acceptable quality and evenness.

Obviously the equipment according to the invention can be actuated by using different fabricating solutions for its different means, devices and components, always within the scope of the invention, according to its specific different installation and service conditions, in particular in cooperation with other operating units of a manufacturing installation in mechanized and automatic cycle.

What I claim is:

1. An apparatus for spraying ceramic ware having a bottom face with a rib thereon, with a liquid glaze, and wherein at least one spray booth is provided and a conveyor system horizontally extends through said booth for conveying the ware there-through, spray guns being supported in said booth above and below the conveyed ware and directed to eject glaze towards and against the upper and the lower faces respectively of said ware, an improvement wherein said conveyor system comprises a plurality of parallel wires located at the same level in spaced relation to contact and support the ware on the rib thereof at a spacing from said lower face, the lower spray guns being obliquely directed for effecting impingement of the liquid glaze on the entire lower face of the ware.

2. An improvement as claimed in claim 1 wherein the lower spray guns are two in number and are disposed at opposite sides of the conveyor system with an oblique orientation such that each gun covers the area of the lower face which is blocked by the wires from being sprayed by the other guns.

3. An improvement as claimed in claim 2 wherein said wires are horizontal and are of relatively small size and contact each piece of ware at four points on the rib thereof.

4. An improvement as claimed in claim 3 comprising a common support for an upper and lower gun on each side of the conveyor means in a respective booth.

5. An improvement as claimed in claim 1 wherein four spray guns are provided, two facing obliquely downwards towards one another above the conveyor system and two facing obliquely upwards towards one another below the conveyor system.

References Cited

UNITED STATES PATENTS

| 2,072,948 | 3/1937 | Geffs | 118—316 X |
| 1,710,953 | 4/1929 | Sullivan | 118—324 X |
| 2,041,765 | 5/1936 | Howell | 118—324 X |
| 2,295,928 | 9/1942 | Bower | 118—324 X |
| 2,846,975 | 8/1958 | Hennessey | 118—324 X |

WALTER A. SCHEEL, *Primary Examiner.*

JOHN P. McINTOSH, *Assistant Examiner.*

U.S. Cl. X.R.

118—324, 326